United States Patent
Permuy et al.

(10) Patent No.: US 6,999,881 B2
(45) Date of Patent: Feb. 14, 2006

(54) METHOD AND APPARATUS FOR DETECTING AND LOCATING NOISE SOURCES WHETHER CORRELATED OR NOT

(75) Inventors: Alfred Permuy, Rueil Malmaison (FR); Joël Millet, Montalieu-Vercieu (FR)

(73) Assignee: Metravib R.D.S., Limonest (FR)

( * ) Notice: Subject to any disclaimer, the term of this patent is extended or adjusted under 35 U.S.C. 154(b) by 74 days.

(21) Appl. No.: 10/736,894

(22) Filed: Dec. 17, 2003

(65) Prior Publication Data

US 2005/0137804 A1 Jun. 23, 2005

(51) Int. Cl.
*G01V 1/00* (2006.01)
*A61F 11/00* (2006.01)
*G01C 17/00* (2006.01)

(52) U.S. Cl. .................. 702/17; 73/40.5 A; 73/624; 381/71.2; 381/92; 702/152

(58) Field of Classification Search ............... 702/14, 702/17, 38, 57, 69, 74, 152; 324/326, 520, 324/536; 73/40.5 A, 624; 381/71.13, 71.14, 381/94.7, 92, 71.2
See application file for complete search history.

(56) References Cited

U.S. PATENT DOCUMENTS

| 4,628,737 A | 12/1986 | Charles et al. |
| 4,811,250 A | 3/1989 | Steber et al. |
| 5,531,099 A * | 7/1996 | Russo ................ 73/40.5 A |
| 6,751,559 B1 * | 6/2004 | Fookes et al. ............ 702/17 |
| 2001/0031053 A1 * | 10/2001 | Feng et al. ................ 381/92 |

FOREIGN PATENT DOCUMENTS

DE 27 04 511 A 8/1978

* cited by examiner

*Primary Examiner*—Michael Nghiem
*Assistant Examiner*—John Le
(74) *Attorney, Agent, or Firm*—Millen, White, Zelano & Branigan, P.C.

(57) ABSTRACT

A method of detecting and locating noise sources each emitting respective signals $S_j$ with j=1 to M, detection being provided by a sound wave or vibration sensors each delivering a respective time-varying electrical signal $s_i$ with i in the range 1 to N, wherein the method steps include: (a) taking the time-varying electrical signals delivered by the sensors, each signal $s_i(t)$ delivered by a sensor being the sum of the signals $S_j$ emitted by the noise sources; (b) amplifying and filtering the time-varying electrical signals as taken; (c) digitizing the electrical signals; (d) calculating a functional; and (e) minimizing the functional relative to the vectors $n_j$ for j=1 to M so as to determine the directions of vector $n_j$ of the noise sources.

5 Claims, 1 Drawing Sheet

METHOD AND APPARATUS FOR DETECTING AND LOCATING NOISE SOURCES WHETHER CORRELATED OR NOT

FIELD OF THE INVENTION

The present invention relates to detecting and locating sources of noise in the general sense, using sensors that are appropriate for the nature of the noise source.

The invention relates to a method of detecting and locating noise sources disposed in a space of one, two, or three dimensions and optionally correlated with one another, and presenting emission spectra of narrow or broad band.

The invention finds particularly advantageous applications in the field of locating sources of noise optionally accompanied by echo and coming, for example, from vehicles, ships, aircraft, or firearms.

BACKGROUND OF THE INVENTION

In numerous applications, a need arises to be able to locate in relatively accurate manner a source of noise in order to take measures to neutralize it. Numerous solutions are known in the prior art for acoustically locating noise sources. The main known solutions make use of techniques for correlating signals delivered by detection sensors.

Those techniques present the drawback of being particularly sensitive to interfering noise occurring in the environment of the measurement sensors. Furthermore, it must be considered that those techniques constitute specific methods that are adapted to each application under consideration.

The technique in most widespread use involves antennas having a large number of sensors (several hundred) and a large computer system implementing beam forming so as to aim in a given direction in order to increase the signal-to-noise ratio. That method does not make any a priori assumption concerning the number of sources and any possible correlation between them, which leads to a loss of resolution.

OBJECTS AND SUMMARY OF THE INVENTION

There therefore exists a need to have a general method of detecting and locating noise sources in space, when the number of noise sources is small and is known or overestimated.

The invention seeks to satisfy this need by proposing a method of detecting and locating noise sources by means of sensors adapted to the nature of the noise source, the method presenting low implementation costs.

To achieve this object, the method of the invention consists:

in taking the time-varying electrical signals delivered by the sensors, each signal $s_i(t)$ delivered by a sensor being the sum of the signals $S_j$ emitted by the noise sources;
in amplifying and filtering the time-varying electrical signals as taken;
in digitizing the electrical signals;
in calculating the functional f, such that:

$$f(n_1, \ldots, n_j, \ldots, n_M) = \frac{\det(<T_k(\omega), T_l^*(\omega)> \quad k, l = 0 \text{ to } M)}{\det(<T_k(\omega), T_l^*(\omega)> \quad k, l = 1 \text{ to } M)}$$

with $$(T_k(\omega))_i = e^{j\omega \frac{<n_k, c_i>}{c}}$$

<.,.> being the scalar product;
$c_i$ being the vector constructed between the center of gravity of the sensors and the position of sensor i;
$n_j$ being the unit vector in the direction defined by the center of gravity of the senors and source j;
with $T_0 = s$; and
with c=the speed of sound; and
in minimizing the functional f relative to the vectors $n_j$ for j=1 to M in such a manner as to determine the directions $n_j$ of the noise sources.

BRIEF DESCRIPTION OF THE DRAWINGS

Various other characteristics appear from the description given below with reference to the accompanying drawing which shows embodiments and implementations of the invention as non-limiting examples.

MORE DETAILED DESCRIPTION

Figure 1:
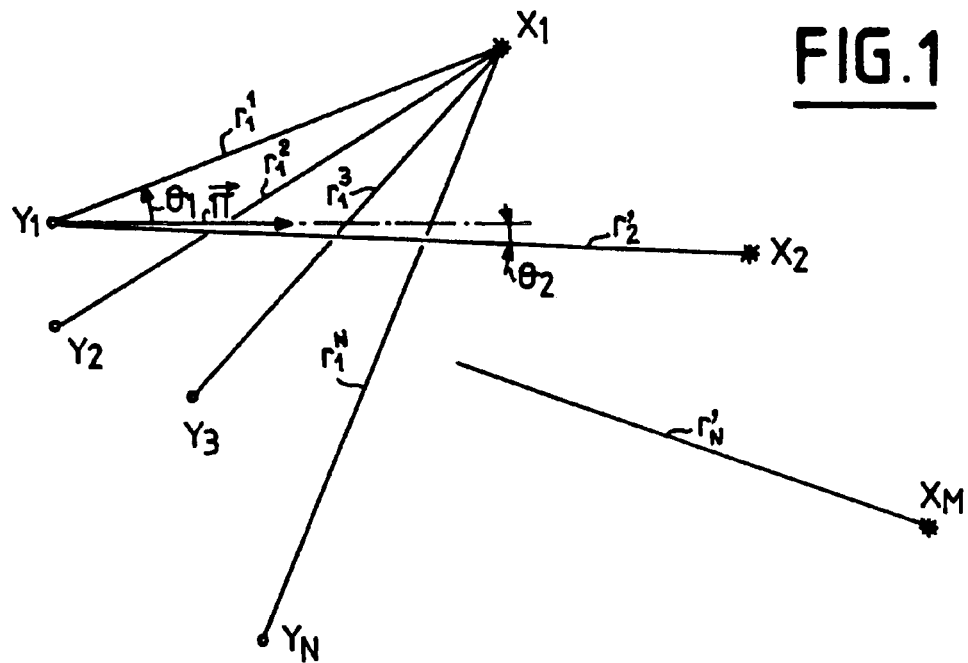
FIG. 1 is a diagram showing the principle of the detection method of the invention.

As can be seen in FIG. 1, the method of the invention consists in locating noise sources $X_1, X_2, \ldots, X_j, \ldots, X_M$ where j varies over the range 1 to M, the sources being distributed in space and each emitting a respective signal $S_j$ with j varying in the range 1 to M. The method of the invention consists in locating the noise sources $X_j$ using sound wave or vibration sensors $Y_1, Y_2, \ldots, Y_i, \ldots, Y_N$ where i varies over the range 1 to N, each delivering a respective time-varying electrical signal $s_1, s_2, \ldots, s_i, \ldots, s_N$.

The method consists in taking the time-varying electrical signals $s_i(t)$ delivered by each of the sensors and representative of the sums of the signals $S_j$ emitted by the noise sources $X_j$. The signals $s_i(t)$ received on the N senors on the basis of the sum of the contributions of the various sources is written as follows:

$$s_i(t) = \sum_{j=1}^{M} A_{ij} S_j\left(t - \frac{r_{ij}}{c}\right)$$

where i=1 to N, $r_{ij}$ is the distance between the noise source $X_j$ and the sensor $Y_i$, and c is the speed of sound in the ambient medium.

The term $A_{ij}$ represents the attenuation due to propagation together with the sensitivity factor of the sensors and is expressed as follows:

$$A_{ij} = B_i C(r_{ij})$$

where i=1 to N and j=1 to M, where $B_i$ is the sensitivity coefficient of sensor $Y_i$ and where $C(r_{ij})$ is the attenuation coefficient due to propagation over a distance $r_{ij}$.

The sensors $Y_i$ are associated with respective electronic units (not shown) for amplifying and lowpass filtering the signals they pick up. The sensors are preferably matched in modulus and phase so that their sensitivities are identical. Thus, $B_i=G$ for $i=1$ to $N$.

Advantageously, in order to facilitate implementing the antenna of sensors as defined above, the sensors $Y_i$ are placed relatively close to one another. Consequently, for remote sources, the distance $r_{ij}$ is of the order of the distance $r_j$, i.e. the distance between the center of gravity of the sensors and the source $X_j$, Thus, attenuation becomes a function of the distance $r_j$ only with $C(r_{ij})=C(r_j)$, with $i=1$ to $N$ and $j=1$ to $M$.

It can be deduced therefrom that:

$$A_{ij}=G.C(r_j)=a(r_j)$$

where $i=1$ to $N$ and $j=1$ to $M$ and:

$$s_i(t) = \sum_{j=1}^{M} a(r_j) S_j\left(t - \frac{r_{ij}}{c}\right)$$

where $i=1$ to $N$.

Since the amplitudes of the sources $X_j$ are unknown, the following equation can be written as follows, integrating the term $a(r_j)$ in $S_j$:

$$s_i(t) = \sum_{j=1}^{M} S_j\left(t - \frac{r_{ij}}{c}\right)$$

where $i=1$ to $N$.

Using Fourier transforms, the expression for the signals $s_i(t)$ becomes:

$$\hat{s}_i(\omega) = \sum_{j=1}^{M} \hat{S}_j(\omega) \cdot e^{-J\omega \frac{r_{ij}}{c}} \quad (1)$$

where $i=1$ to $N$ where $\hat{s}$ and $\hat{S}$ are the Fourier transforms of $s$ and $S$ respectively and where $\omega$ is angular frequency.

This first equation (1) relates the received signals to the distance $r_{ij}$, i.e. to the positions of the sources $X_j$.

Figure 2:
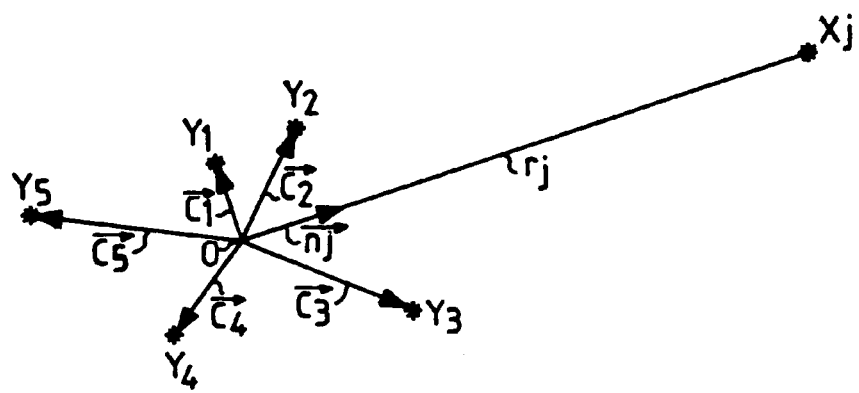
FIG. 2 is a diagram showing a detail characteristic to the method of the invention.

As can be seen in FIG. 2, other relationships can be expressed, associated with geometrical considerations enabling the distances $r_{ij}$ to be related to the unit vector $n_j$, which determines the direction defined by the center of gravity of the sensors and the source generating the signal $S_j$. The position of the senors is defined by the vector $C_i$ constructed from the positions of the sensors $Y_i$ and the position of their center of gravity. A development restricted to the first order of $r_{ij}$ then provides:

$$r_{ij} \approx r_j - <n_j, c_i> \quad (2)$$

where $i=1$ to $N$ and $j=1$ to $M$, and where $<.,.>$ is the scalar product.

Thus, by replacing $r_{ij}$ by the approximate expression given in (2) and integrating the phase term:

$$e^{-J\omega \frac{r_j}{c}}$$

which depends only on the source $X_j$ in the magnitude $\hat{S}_j(\omega)$, equation (1) can be written:

$$\hat{s}_i(\omega) = \sum_{j=1}^{M} \hat{S}_j(\omega) \cdot e^{-J\omega \frac{<n_j, c_i>}{c}} \quad (3)$$

where $i=1$ to $N$.

This relationship can also be expressed in matrix and vector form:

$$\hat{s}_i(\omega) = \sum_{j=1}^{M} \hat{S}_j(\omega) \cdot T_j(\omega) \quad (4)$$

with, for ith coordinate of the vector $T_j$:

$$(T_j)_i = e^{-J\omega \frac{<n_j, c_i>}{c}}$$

where $i=1$ to $N$.

Or indeed:

$$s(\omega)=T.S(\omega) \quad (5)$$

where $T$=matrix having the general term:

$$T_{ij} = e^{-J\omega \frac{<n_j, c_i>}{c}}$$

In the presence of additive noise, equation (4) becomes:

$$s_i(\omega) = \sum_{j=1}^{M} \hat{S}_j(\omega) \cdot T_j(\omega) + B(\omega) \quad (6)$$

where $B$ is the noise vector which depends on $\omega$.

The method of the invention consists in determining the directions of the sources $X_j$ defined by the vectors $n_j$ for $j=1$ to $M$.

When the sources $X_j$ are arbitrary, i.e. correlated or non-correlated, the probability of the presence of Gaussian noise $B$ at the sensors $Y_i$ is given by:

$$b \cdot e^{-a \int |B|^2 \cdot d\omega}$$

where $a$ and $b$ depend on the variance.

Thus, from equation (6), the most probable position for the source is the position which minimizes the following magnitude:

$$\left\| s(\omega) = \sum_{j=1}^{M} \hat{S}_j(\omega) \cdot T_j(\omega) \right\|^2$$

In other words, the projection of s onto the direction orthogonal to the hyperplane generated by the vectors $T_j$ for j=1 to M must be of minimum norm.

That constitutes the square of the height of the parallelepiped constructed on the vectors s and $T_j$, said height h being calculated as the ratio of the volume V to the base area S, i.e.:

$$h = \frac{V}{S}$$

The magnitudes V and S are expressed as a function of the determinants of the Gramm matrices in which the element (k, l) is constituted by the scalar product:

$<T_k,T_l^*>$ with $T_l^*$ being the vector that is the conjugate of $T_l$.
Thus, $S^2 = det(<T_k,T_l^*>,k,l=1$ to $M)$ $V^2 = det(<T_k,T_l^*>,k,l=0$ to $M)$ in which it is assumed $T_0=s$.
Thus:

$$\|B\|^2 = \frac{V^2}{S^2}$$

or indeed:

$f(n_1, \ldots, n_j, \ldots, n_M) = \|B\|^2$

This is a function of the vectors $n_j$, which in three dimensions depends only on two angles $\theta_j$ and $\phi_j$, i.e. elevation and azimuth, and on angular frequency $\omega$. Any a priori knowledge about the spectra of the sources $\hat{S}_j$ can also be used. For example:

for narrow band noise sources, provision is made to minimize the following functional $f_1$:

$$f_1 = \sum_k \|B(\omega)_k\|^2 \qquad (7)$$

$\omega_k$ being the angular frequencies of interest; and
for broad band noise sources, provision is made to minimize the following functional $f_2$ relating to the segments of interest:

$f_2 = \int \|B(\omega)\|^2 d\omega$ (8)

In practice, instead of calculating $\|B\|^2$ it is possible to use a sub-optimal method which consists in replacing the denominator $S^2$ by 1. It can then be shown, providing a search is being made for solution directions $n_j$ that are sufficiently distinct, that solutions can be obtained that are close to those given by the exact method. The denominator, which cancels when at least two sources coincide, serves to eliminate interfering solutions where a plurality of directions are identical.

When the sub-optimal method comprises broad band processing, it comprises minimizing the following functional $f_3$:

$f_3 = \int det(<T_k,T_l^*>,k, l=0$ to $M)d\omega$ (9)

This magnitude, which is expressed as a linear combination of the cross-correlation functions $\gamma_{ij}$ of the signals $s_i$ and $s_j$ taken at points which are themselves a linear combination of the delays:

$$\frac{<n_j, c_i>}{c}$$

These cross-correlation functions are calculated only for delays having the same order of magnitude as the dimensions of the antenna divided by the speed of sound. Calculation can then advantageously be performed in the time domain as compared with calculation that is usually performed in the frequency domain on the basis of Fourier transforms.

The above-described method thus consists:
starting from an antenna comprising a plurality of sensors (two to ten, and preferably two to five) in picking up acoustic or vibratory information;
in amplifying and in filtering the received signals so as to limit their spectrum and match the sensors in phase and in gain;
in digitizing the signals; and
in minimizing the projection of the vector s onto the direction orthogonal to the vectors $T_j$, using the following two calculation techniques a) and b):
a) + in obtaining the Fourier transforms of the signals $s_i$;
+ in calculating one of the functionals $f_1$, $f_2$, using the above-defined expressions for the Gramm matrix determinants; and
+ minimizing one of the functionals $f_1$, $f_2$ depending on the number of sources to be located;
b) + in using a simplified algorithm which consists in minimizing the functional $f_3$;
+ in calculating the cross-correlation functions $\gamma_{ij}$; and
+ in minimizing a linear combination of the cross-correlation functions, depending on the number of sources.

Once the minimization operation has been performed, the directions $n_j$ of the noise sources are determined. Advantageously, it is also possible to recover the characteristics of the noise sources $X_j$.

If N=M, i.e. if there are as many sensors as sources, then the system (5) can in general be inverted.

If N≧M, the problem can be reduced to a square system by premultiplying by:

$^tT^*$ i.e. by the conjugate transposed matrix of T. System (5) then becomes:

$^tT^* \cdot s(\omega) = {}^tT^* \cdot T \cdot S(\omega)$

I.e.

$S(\omega) = ({}^tT^* \cdot T)^{-1} \cdot {}^tT^* \cdot s(\omega)$ (10)

From equation (10), the signals $S_j$ can be calculated so as to discover the characteristics of the sources $X_j$.

The description below gives an implementation for detecting one noise source (M=1) using N sensors.

This provides:

$$\|B(\omega)\|^2 = \frac{\begin{vmatrix} \|s(\omega)\|^2 & \sum_{i=1}^{N} \hat{s}_i *(\omega) e^{+J\omega\frac{<n,c_i>}{c}} \\ \sum_{i=1}^{N} \hat{s}_i *(\omega) e^{-J\omega\frac{<n,c_i>}{c}} & N \end{vmatrix}}{N}$$

i.e.:

$$\|B(\omega)\|^2 = \frac{1}{N}\left[(N-1)\cdot\|s(\omega)\|^2 - \sum_{\substack{k,l \\ k \neq l}} \hat{s}_k(\omega)\hat{s}_l(\omega) e^{j\omega\frac{<n,c_l-c_k>}{c}}\right]$$

For broad band sources, it is thus a question of minimizing:

$$\int \|B(\omega)\|^2 d\omega =$$

$$\frac{1}{N}\left[(N-1)\int \|s(\omega)\|^2 d\omega - \sum_{\substack{k,l \\ k \neq l}} Re\left\{\int \hat{s}_k(\omega)\hat{s}_l(\omega) e^{j\omega\frac{<n,c_l-c_k>}{c}} d\omega\right\}\right]$$

I.e. writing the cross-correlations between the measured signals as $\gamma_{kl}$:

$$\int \|B(\omega)\|^2 d\omega = \frac{1}{N}\left[(N-1)\int \|s(\omega)\|^2 dt - \sum_{\substack{k,l \\ k \neq l}} \gamma_{kl}\left(\frac{<n,c_l-c_k>}{c}\right)\right]$$

The problem thus reduces to maximizing:

$$\sum_{\substack{k,l \\ k \neq l}} \gamma_{kl}\left(\frac{<n, c_l - c_k>}{c}\right)$$

by varying n which depends on only Np parameters, where Np is equal to the dimension of the space minus 1 unit.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever. Also, any preceding examples can be repeated with similar success by substituting the generically or specifically described reactants and/or operating conditions of this invention for those used in such examples.

Throughout the specification and claims, all temperatures are set forth uncorrected in degrees Celsius and, all parts and percentages are by weight, unless otherwise indicated.

The entire disclosures of all applications, patents and publications, cited herein are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method of detecting and locating noise sources each emitting a respective signal $S_j$ with j=1 to M, detection being provided by means of acoustic wave or vibration sensors each delivering a respective time-varying electrical signal $s_i$ with i lying in the range 1 to N, the method comprising:

taking the time-varying electrical signals delivered by the sensors, each signal $s_i(t)$ delivered by a sensor being the sum of the signals $S_j$ emitted by the noise sources;

amplifying and filtering the time-varying electrical signals as taken;

digitizing the electrical signals;

calculating the functional f, such that:

$$f(n_l, \ldots, n_j, \ldots, n_M) = \frac{\det(<T_k(\omega), T_l^*(\omega)> k, l = 0 \text{ to } M)}{\det(<T_k(\omega), T_l^*(\omega)> k, l = 1 \text{ to } M)}$$

with $$(T_k(\omega))_i = e^{J\omega\frac{<n_k,c_i>}{c}}$$

<.,.> being the scalar product;

$c_i$ being the vector constructed between the center of gravity of the sensors and the position of sensor i;

$n_j$ being the unit vector in the direction defined by the center of gravity of the senors and source j;

with $T_0$=s; and with c=the speed of sound; and in minimizing the functional f relative to the vectors $n_j$ for j=1 to M in such a manner as to determine the directions $n_j$ of the noise sources, wherein ω is angular frequency, $<T_k(\omega), T_l^*(\omega)>$ is the scalar product between $T_k(\omega)$, and $T_l^*(\omega)$, J corresponds to the imaginary number in mathematics.

2. A method according to claim 1, wherein, in order to minimize the functional f when the noise sources are narrow band sources, the method comprises:

calculating the Fourier transforms of the signals $s_i(t)$ delivered by the sensors;

using the expressions for the determinants of the matrices of general term:

$<T_k(\omega),T_l^*(\omega)>$ to calculate the functional:

$$f_1 = \sum_k \|B(\omega)_k\|^2$$

and after selecting a determined number of noise sources, minimizing the functional $f_1$ to determine the directions $n_j$ of the selected noise sources, wherein B is the noise vector which depends on $\omega$.

3. A detection method according to claim 1, wherein, in order to minimize the functional f when the noise sources are broad band, the method comprises:

calculating the Fourier transforms of the signals $s_i(t)$ delivered by the sensors;

using the expressions of the determinants of the matrices of general term:

$$<T_k(\omega), T_l^*(\omega)>$$

to calculate the functional:

$$f_2 = \int \|B(\omega)\|^2 d\omega$$

and after selecting a determined number of noise sources, minimizing the functional $f_2$ to determine the directions $n_j$ of the selected noise sources, wherein $d\omega$ is the derived term in the integral mathematics formulation.

4. A detection method according to claim 1, wherein, in order to minimize the functional f, the method comprises: simplifying the expression for the functional $f$ to minimize the following functional $f_3$:

$$f_3 = \int det(<T_k, T_l^*>k, \, l=0 \text{ to } M) d\omega$$

calculating cross-correlation functions $\gamma_{ij}$ of the signals $s_i$ and $s_j$; and after selecting a determined number of noise sources, minimizing the functional $f_3$, wherein $<T_k, T_l^*>$ is the scalar product between $T_k$ and $T_l^*$.

5. A detection method according to claim 1, wherein, after the minimization operation, the method comprises calculating the source vector:

$$S(\omega) = ({}^t T^*.T)^{-1}.{}^t T^*.s(\omega)$$

in order to discover the characteristics of the noise sources, wherein ${}^t T^*$ is the conjugate transposed matrix of T and T is a matrix, $S(\omega)$ is the vector of S which depends on $\omega$.

* * * * *